US005703637A

United States Patent [19]
Miyazaki et al.

[11] Patent Number: 5,703,637
[45] Date of Patent: Dec. 30, 1997

[54] RETINA DIRECT DISPLAY DEVICE AND TELEVISION RECEIVER USING THE SAME

[75] Inventors: Shigeyuki Miyazaki; Hiroshi Yokokawa; Yuichi Ninomiya, all of Tokyo, Japan

[73] Assignees: Kinseki Limited; Nippon Hoso Kyokai, both of Japan

[21] Appl. No.: 328,647

[22] Filed: Oct. 26, 1994

[30] Foreign Application Priority Data

Oct. 27, 1993 [JP] Japan ................... 5-268864

[51] Int. Cl.$^6$ ........................ H04N 9/31
[52] U.S. Cl. .............. 348/53; 345/8; 348/744
[58] Field of Search ............ 345/9, 8; 348/53, 348/744

[56] References Cited

U.S. PATENT DOCUMENTS 5,355,181 10/1994 Ashizaki et al. .................. 348/744
5,422,653 6/1995 Maguire, Jr. ........................ 345/9

FOREIGN PATENT DOCUMENTS 2-5 1/1990 Japan.
2-161930 6/1990 Japan.
3-214872 9/1991 Japan.

Primary Examiner—Mark R. Powell
Attorney, Agent, or Firm—Dickstein Shapiro Morin & Oshinsky LLP

[57] ABSTRACT

A retina direct display device provides an observer with the display of a plane image or a stereoscopic image. The retina direct display device is, for example, incorporated with an acoustic device to constitute a television receiver. The retina direct display device comprises a visible light conversion means, a retina projection means and an eye movement tracking means. The visible light conversion means converts an input video signal to a beam of visible light. The retina projection means deflects the beam horizontally and vertically so that retinas are raster scanned through pupils of both eyes by the deflected beam. The eye movement tracking means detects the movement direction of the pupils and permits the direction of the beam emitted from the retina projection means to track the movement of the pupils based on the result of the detection. Accordingly, the device enables the video display of high resolution without deteriorating picture quality of the input video signal of high quality and also enables the reduction of the size and manufacturing cost of the device.

16 Claims, 9 Drawing Sheets (a)             (b)

RETINA DIRECT DISPLAY DEVICE AND TELEVISION RECEIVER USING THE SAME

BACKGROUND OF THE INVENTION

1. Field of the Invention

The present invention relates to a retina direct display device for converting a video signal to a beam of visible light, deflecting the beam horizontally and vertically so that raster scanning in performed on retinas, namely, the retinas are subjected to raster scanning by the beam (hereinafter called as retinas are raster scanned by the beam) through pupils of both eyes and displaying two-dimensional (i.e. a flat image) or three-dimensional video image (i.e. stereoscopic image) on the retina and a television receiver using the same.

2. Prior Art

As a prior art of this field, there has been a technique which is disclosed in the following references.

First Reference: Japanese Patent Laid-Open Publication No. 2-5, which is entitled "DEVICE FOR DETECTING EYE DIRECTION OF CAMERA" and published on Jan. 5, 1990.

Second Reference: Japanese Patent Laid-Open Publication No. 2-161930, which is entitled "LASER SCANNING TYPE LIGHT FREEZING DEVICE" and published on Jun. 21, 1990.

Third Reference: Japanese Patent Laid-Open Publication No. 3-214872, which is entitled "SPECTACLE TYPE RETINA DIRECT DISPLAY DEVICE" and published on Sep. 20, 1991.

There is described in the first reference a device for detecting eye direction of camera having a body of camera which incorporates therein a light sending system for guiding parallel beams of light to photographer's eye, a light receiving system having a receiving portion for receiving a reflected light to form a first Purkinje image based on the mirror reflection of a cornea of the eye and the reflected light from the eyeground, a processing circuit for detecting photographers' eye direction based on an output of the received light in the receiving portion.

There is described in the second reference a laser scanning type light freezing device provided with a laser light source for outputting a low energy light for observation, a high energy light for freezing light, a single two-dimensional scanner for deflecting a laser beam from the laser light source two-dimensionally, an object lens for condensing the laser beam deflected by the two-dimensional scanner on the eyeground to be detected, an observation means for receiving the reflected light on the eyeground by the low energy light to thereby observe the eyeground, a coordinate input means for setting a light freezing position by the high energy light, and a controller for controlling the two-dimensional scanner so that the eyeground is raster scanned by the laser beam when only the low energy light is output and for controlling the two-dimensional scanner so as to reduce the scanning speed of at least the laser beam when the high energy light is output at the light freezing position.

The third reference has a close relation with the present invention and discloses a conventional spectacle type retina direct display device. That is, the spectacle type retina direct display device as disclosed in the third reference is provided with a point light source comprising a tungsten lamp and a mirror, a video plate which is irradiated by the point light source, and a short-focused eyepiece which is positioned integrally with the video plate wherein these elements are attached to a spectacle type frame. The video plate comprises, e.g. a transmission type liquid crystal plate having a color filter and it is driven by a video signal supplied from a display driving circuit which is employed by a liquid crystal television.

In the spectacle type retina direct display device of this type, the light emitted from the point light source passes through the video plate and it is focused on the pupil on the surface of the eyeball by the eyepiece. A real image on the video plate is focused on the pupil and it is reversed by the crystalline lens and then the image is formed on the retina.

When an observer wears the spectacle type retina direct display device so as to position the pupil on the focus of the eye lens, only the image on the video plate which is driven by the video signal can be clearly detected irrespective of an individual eye sight (shortsighted, far-sighted). Further, since the image to be incident to the eyeball permits a visual field angle to be 60°, the observer can see a powerful picture as if he saw the large screen at close range.

However, there are following problems in the spectacle type retina direct display device as described in the third reference.

In the conventional retina direct display device, a visible image can be seen in the manner that the video signal is converted into the visible image by the video plate which is a type of display and the visible image is formed on the retina of the eyeball.

Accordingly, even if the video signal of high quality is input, it has been difficult to obtain high resolution since the picture quality is deteriorated due to the structure of the video plate in case of converting the video signal of high quality into the visible image by the video plate. Further, since the video plate is required, there is a limit to reduce the size and manufacturing cost, and hence it has been difficult to obtain a retina direct display device which is satisfactory technically.

First aspect of the invention is to provide a direct display device for converting an input video signal into a beam of visible light by a visible light conversion device so that retina is directly raster scanned by the beam through pupils of both eyes, tracking the movement of the pupils by an eye movement tracking means at the time of raster scanning, thereby enabling the video display of high resolution without deteriorating picture quality of an input video signal of high quality and also enabling the reduction of the size and manufacturing cost of the device involved in dispensing with the conventional video plate.

A second object of the invention is to provide a retina direct display device for converting an input video signal for right eye into a beam for right eye by a visible light conversion means for right eye, converting an input video signal for left eye into a beam for left eye by a visible light conversion means for left eye, deflecting the beams of right and left eyes horizontally and vertically by retina projection devices for right and left eyes so that retinas are directly raster scanned by the detected beams through the pupils of both eyes, thereby displaying a stereoscopic image of high resolution without deteriorating picture quality of the input video signal of high quality and also enabling the reduction of the size and manufacturing cost of the device involved in dispensing with the conventional video plate.

A third object of the invention is to provide a retina direct display device for permitting the diameter of beam emitted from the retina projection device to be equal to or larger than the diameter of the pupil but smaller than the diameter of the crystalline lens by an optical system, thereby enabling the scanning of the retina adapted for the physiological change of the diameter of the pupil so as to lessen the eye fatigue.

A fourth object of the invention is to provide a retina direct display device capable of improving the accuracy of scanning of the retina by emitting a coherent laser beam from the retina projection device since the laser beam is high convergent light. However, if the powerful laser beam is irradiated on the eye for a long time, it is likely to be injurious to the health, and hence it is advisable to use a low powerful laser beam which is unstimulating to the eye. Further, since the incoherent beam of visible light, which is lower in the convergence than the laser beam, is emitted from the retina projection means, the scanning accuracy is slightly deteriorated but such beam is unstimulating to the eye, thereby enabling the provision of the retina direct display device which is less injurious to the health.

A fifth object of the invention is to provide a retina direct display device capable of observing a powerful video image on a large picture screen compared with the observation of the video image on a normal television.

A sixth object of the invention is to provide a retina direct display device attached to a spectacle type frame which enables the reduction of the length between the retina projection means and both eyes and also enables the observation of the video image as if he saw the large screen of a television with small device. Further, since the distance between the retina projection means and the both eyes are reduced, the eye tracking accuracy is improved and the arrangement of the eye movement tracking means is more simplified.

A seventh object of the invention is to provide a television receiver including a retina direct display device and an acoustic device, which enables the display of a plane image or a stereoscopic image having high resolution without deteriorating the picture quality of the input video signal of high quality and also enables the reduction of the size and the manufacturing cost.

To achieve the aforementioned objects, the retina direct display device according to the first aspect of the invention comprises a visible light conversion means for converting a video signal to a beam of visible light, a retina projection device having a two-dimensional scanning means for deflecting the beam horizontally and vertically so that retinas are raster scanned through pupils of both eyes by the beam, and an eye movement tracking means for detecting the movement direction of the pupils and permitting the direction of the beam emitted from the retina projection means to track the movement of the pupils based on the result of detection.

The retina direct display device according to the second aspect of the invention comprises a visible light conversion means for right eye for converting a video signal for right eye into a beam of visible light for right eye, a visible light conversion means for left eye for converting a video signal for left eye into a beam of visible light for left eye, wherein said video signals for right and left eyes being produced by photographing in different angles, a retina projection means for right eye having a two-dimensional scanning means for right eye for deflecting the beam for right eye horizontally and vertically so that a right retina is raster scanned by the deflected beam for right eye through a pupil of right eye, a retina projection means for left eye having a two-dimensional scanning means for left eye for deflecting the beam for left eye in synchronization with the deflection of beam by the two-dimensional scanning means for right eye so that a left retina is raster scanned by the deflected beam for left eye through a pupil of left eye, and an eye movement tracking means for detecting the movement of one of or both of the right and left pupils, and permitting the directions of beams emitted from the retina projection devices for right and left eyes to track the movement of one or both of the right and left pupils based on the result of detection.

The retina direct display device according to the third aspect of the invention includes an optical system for permitting the diameter of the beam emitted from the retina projection means in the first and second aspects of the invention to be equal or larger than the diameter of the pupil and to be smaller than the diameter of a crystalline lens of eyeball.

In the retina direct display device according to the fourth aspect of the invention, the beam in the first, second and third aspects of the invention comprises a coherent laser beam or an incoherent optical beam.

In the retina direct display device according to the fifth aspect of the invention, the visible light conversion means, retina projection means and eye movement tracking means in the first, second, third and fourth aspects of the invention are provided at a position remote from an observer at a given interval.

In the retina direct display device according to the sixth aspect of the invention, the visible light conversion means, retina projection means and eye movement tracking means in the first, second, third and fourth aspects of the invention are respectively attached to a spectacle type frame.

In a television receiver according to the seventh aspect of the invention, the retina direct display device in the first, second, third, fourth, fifth or sixth embodiment is incorporated into the television receiver and includes an acoustic device for converting a sound signal to a sound.

The aforementioned objects and other objects and noble features of the invention will be completely evident with reference to the detailed description together with attached drawings. The drawings do not limit the scope of the invention but merely explain the invention.

PREFERRED EMBODIMENT OF THE INVENTION

First Embodiment (FIGS. 1 to 4)

Figure 1:
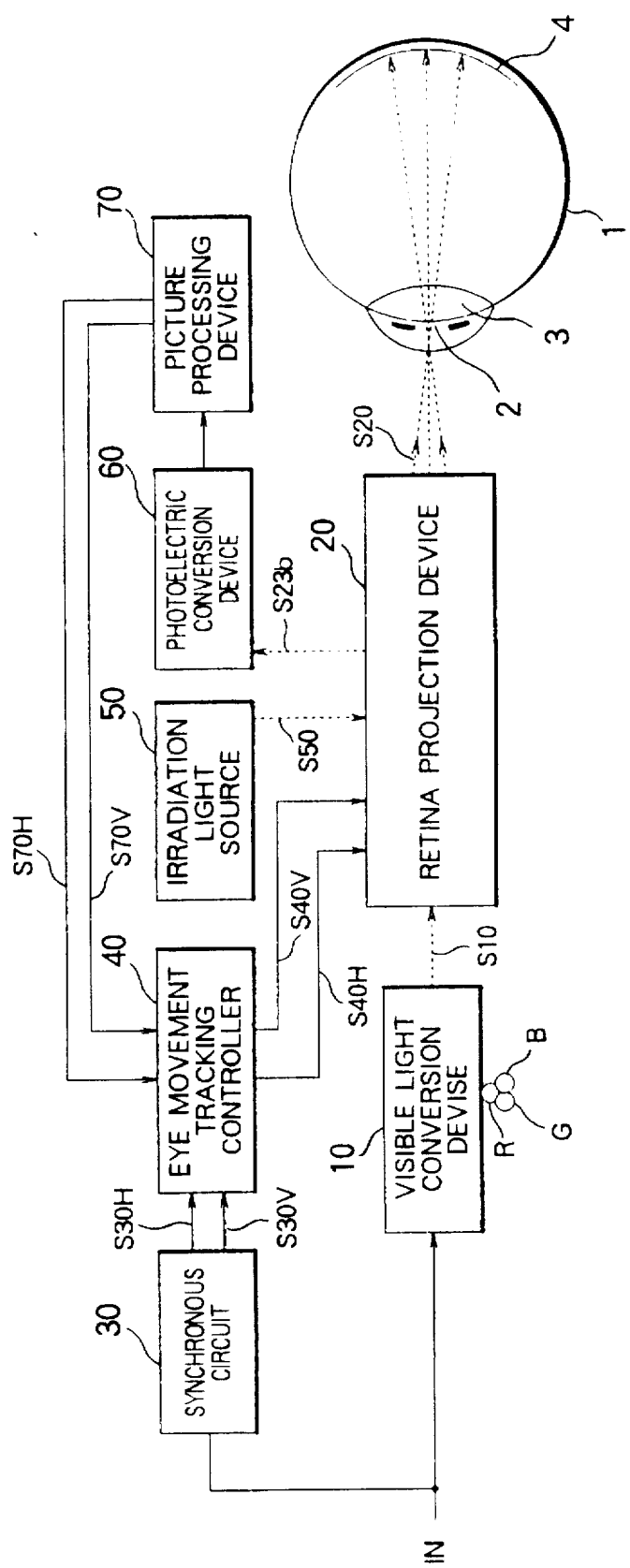
FIG. 1 is a block diagram showing an arrangement of a projection type retina direct display device according to a first embodiment of the invention.

A projection type retina direct display device in FIG. 1 is a device located at a position remote from a video observer at an a given interval. This device converts a video signal IN comprising primary colors of red, green and blue into a beam S10 of visible light (coherent laser beam or incoherent beam of light), deflects the beam S10 so that a retina 4 is raster scanned by the deflected beam through a pupil 2 and a crystalline lens 3 of an eyeball 1, thereby enabling a video display of a plane image.

That is, this projection type retina direct display device includes a visible light conversion device 10 serving as a visible light conversion means for converting the video signal IN comprising primary colors of red, green and blue into the beam S10. A retina projection device 20 serving as a retina projection means is connected to an output side of the visible light conversion device 10. The retina projection device 20 is a device resembling the laser scanning type light freezing device in the aforementioned second reference and includes a two-dimensional scanning means for scanning an incident beam S10 in horizontal and vertical directions in response to a horizontal deflection signal S40H and a vertical deflection signal S40V and has a function for projecting a beam S20 of visible light which is deflected by the two-dimensional scanning means on the eyeball 1 so that the retina 4 is raster scanned by the beam S20 through the pupil 2 and crystalline lens 3 of the eyeball 1.

Connected to the retina projection device 20 is an eye movement tracking means for detecting the movement direction of the pupil 2 and permitting the direction of the beam emitted from the retina projection device 20 to track the movement of the pupil 2 based on the result of detection. The eye movement tracking means is a technique resembling to the device for detecting eye direction of camera as disclosed in the aforementioned first reference and comprises a synchronous circuit 30, an eye movement tracking controller 40, an irradiation light source 50, a photoelectric conversion device 60 and a picture processing device 70.

The synchronous circuit 30 is a circuit for extracting a horizontal synchronous signal S30H and a vertical synchronous signal S30V which are respectively included in the video signal IN. The eye movement tracking controller 40 is connected to an output side of the synchronous circuit 30. The eye movement tracking controller 40 outputs the horizontal deflection signal S40H and vertical deflection signal S40V in response to the horizontal synchronous signal S30H and vertical synchronous signal S30V and eye movement information signals by the picture processing device 70, namely, signals representing the detection of the movement of the pupil 2 (hereinafter referred to a horizontal movement detection signal S70H and a vertical movement detection signal S70V) and has a function for permitting the direction of the beam emitted from the retina projection device 20 to track the direction of the movement of the pupil 2.

The irradiation light source 50 is a light source for irradiating an irradiation beam S50 (e.g. a coherent infrared laser beam or incoherent beam of light). The irradiation beam S50 irradiated from the irradiation light source 50 is reflected on, for example, a beam splitter such as a half mirror provided inside the retina projection device 20 and sent to the direction of the eyeball 1, then it is reflected on the eyeball 1. A reflected irradiation beam S23b which is reflected on the eyeball 1 is reflected on, for example, the beam splitter such as the half mirror provided inside the retina projection device 20 and is sent to the photoelectric conversion device 60.

The photoelectric conversion device 60 is a device for converting the reflected irradiation beam S23b which is sent from the retina projection device 20 into an electric signal and comprises an image sensor such as a charge coupled device (hereinafter referred to as a CCD). The picture processing device 70 is connected to an output side of the photoelectric conversion device 60. The picture processing device 70 receives an output signal of the photoelectric conversion device 60 and compares an image data of the pupil 2 of the present frame and an image data of the pupil 2 of one previous frame and detects the movement of the pupil 2 and then supplies horizontal and vertical movement detection signals S70H and S70V to the eye movement tracking controller 40. The picture processing device 70 comprises a central processing unit (hereinafter referred to as a CPU), a memory and the like.

Figure 2:
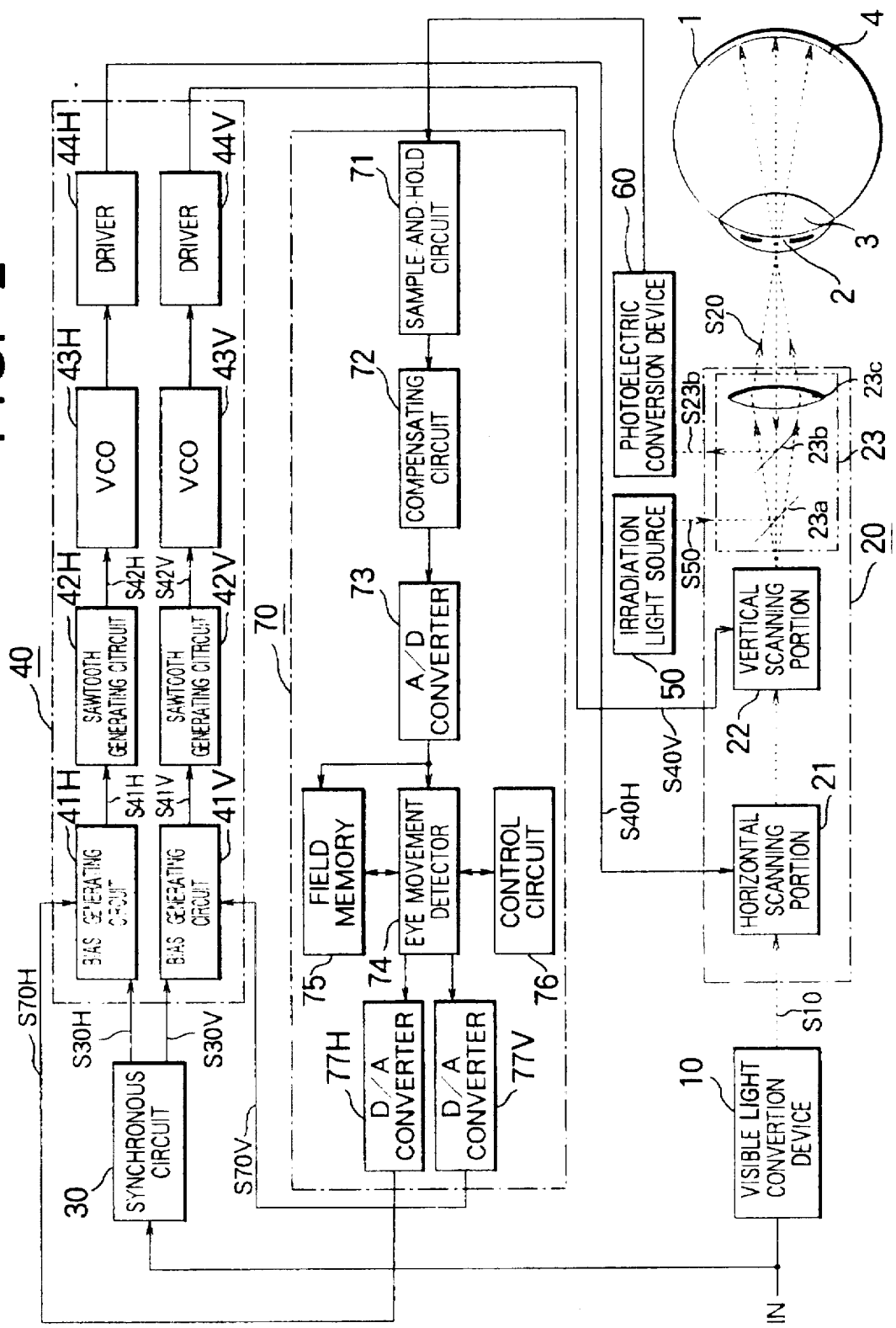
FIG. 2 is a detailed arrangement of the projection type retina direct display device of FIG. 1.

As shown in FIG. 2, the retina projection device 20 comprises a two-dimensional scanning means composed of a horizontal scanning portion 21 and a vertical scanning portion 22 and an optical system 23. The horizontal scanning portion 21 has a function to scan the beam S10 emitted from the visible light conversion device 10 in the horizontal direction in response to the horizontal deflection signal S40H output from the eye movement tracking controller 40. The vertical scanning portion 22 has a function to seen the beam S10, which was scanned horizontally by the horizontal scanning portion 21, in the vertical direction in response to the vertical deflection signal S40V output from the eye movement tracking controller 40. The optical system 23 is provided with two beam splitters 23a and 23b each composed of, e.g. the half mirror, etc. and a convergent lens 23c. One beam splitter 23a has a function to deflect the irradiation beam S50 which is irradiated from the irradiation light source 50 in the direction of the eyeball 1 and the other beam splitter 23b has a function to reflect the irradiation beam S23b reflected on the eyeball 1 to the side of the photoelectric conversion device 60. The convergent lens 23c converges the beam S20 which is sent from the vertical scanning portion 22 through the beam splitters 23a and 23b and focuses the converged beam S20 on the pupil 2.

The eye movement tracking controller 40 comprises a bias generating circuit 41H, a sawtooth generating circuit 42H, a voltage controlled oscillator (hereinafter referred to as a VCO) 43H, a driver 44H which are respectively disposed at horizontal synchronous side, a bias generating circuit 41V, a sawtooth generating circuit 42V, a VCO 43V and a driver 44V which are respectively disposed at vertical synchronous side.

The bias generating circuit 41H receives a horizontal synchronous signal S30H output from the synchronous circuit 30 and generates a bias signal S41H in response to the horizontal movement detection signal S70H which is sent from the picture processing device 70. The sawtooth generating circuit 42H is connected to an output side of the bias generating circuit 41H. The sawtooth generating circuit 42H generates a sawtooth wave and overlays the bias signal S41H on the sawtooth wave and outputs a sawtooth wave signal S42H and it comprises a blocking oscillator, etc. The VCO 43H is connected to an output side of the sawtooth generating circuit 42H. The VCO 43H is an oscillator in which an oscillating frequency is varied in response to a level of voltage of the sawtooth wave signal S42H. The driver 44H is connected to an output side of the VCO 43H. The driver 44H drives the output signal of the VCO 43H, thereby outputting the horizontal deflection signal S40H to the horizontal scanning portion 21 in the retina projection device 20.

In the same manner as the bias generating circuit 41H, the bias generating circuit 41V receives a vertical synchronous signal S30V output from the synchronous circuit 30 and generates a bias signal S41V in response to the vertical movement detection signal S70V which is sent from the picture processing device 70. The sawtooth generating circuit 42V is connected to an output side of the bias generating circuit 41V. The sawtooth generating circuit 42V generates a sawtooth wave and overlays the bias signal S41V on the sawtooth wave and outputs a sawtooth wave signal S42V and it comprises a blocking oscillator, etc. The VCO 43V is connected to an output side of the sawtooth generating circuit 42V. The VCO 43V is an oscillator in which an oscillating frequency is varied in response to a level of voltage of the sawtooth wave signal S42V. The driver 44V is connected to an output side of the VCO 43V. The driver 44V drives the output signal of the VCO 43V, thereby outputting the vertical deflection signal S40V to the vertical scanning portion 22 in the retina projection device 20.

The picture processing device 70 comprises a sample-and-hold circuit 71, a compensating circuit 72, an analog-to-digital converter 73 (hereinafter referred to as an A/D converter), an eye movement detector 74, a field memory 75, a control circuit 76 and digital-to analog converters 77H and 77V (hereinafter referred to as D/A converters).

The sample-and-hold circuit 71 is a circuit for sampling and holding an output signal of the photoelectric conversion device 60. The compensating circuit 72 is connected to an output side of the sample-and-hold circuit 71. The compensating circuit 72 is a circuit for subjecting an output signal of the sample-and-hold circuit 71 to an automatic gain control (hereinafter referred to as an AGC) and a nonlinear processing (hereinafter referred to as γ compensation). The A/D converter 73 is connected to an output side of the compensating circuit 72. The A/D converter 73 is a circuit for converting an output signal of the compensating circuit 72 into a digital signal. The eye movement detector 74 and the field memory 75 are connected to an output side of the A/D converter 73.

The field memory 75 is a memory for storing therein an image signal of one previous frame and an operation to write data in the field memory 75 and an operation to read the data from the field memory 75 (i.e. accessing operation) are controlled by the eye movement detector 74. The eye movement detector 74 is a circuit having a function to control the accessing operation relative to the field memory 75 and it compares the image signal of one previous frame which is supplied from the field memory 75 and the image signal of the present frame which is supplied from the A/D converter 73, thereby obtaining the direction and quantity of the movement of the pupil 2 (i.e. movement vector) so as to output the movement detection signal corresponding to this movement vector.

The eye movement detector 74 and field memory 75 are controlled by a control circuit 76 comprising a microcomputer having a CPU, etc. Two D/A converters 77H and 77V are connected to an output side of the eye movement detector 74. One D/A converter 77H converts an output signal of the eye movement detector 74 into an analog signal, thereby outputting the horizontal movement detection signal S70H to the bias generating circuit 41H. The other D/A converter 77V converts the output signal of the eye movement detector 74 into an analog signal, thereby outputting the vertical movement detection signal S70V to the bias generating circuit 41V.

Figure 3:
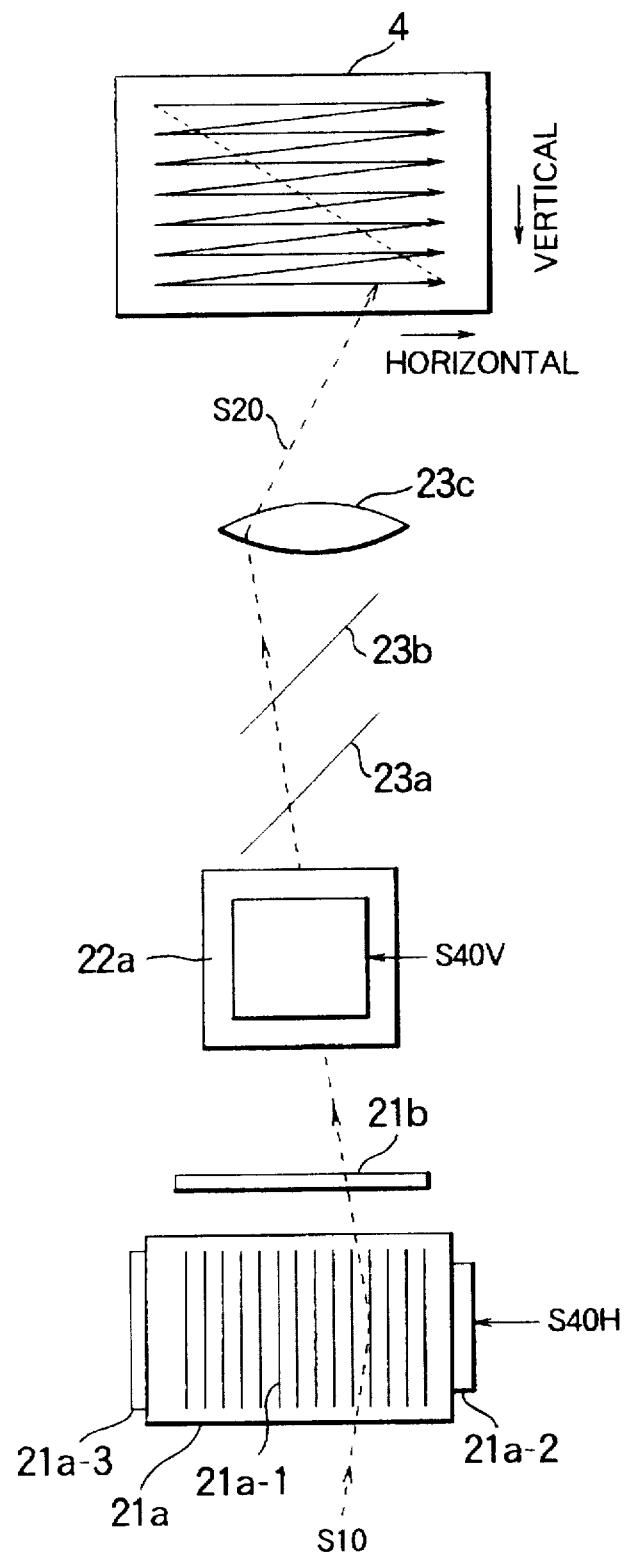
FIG. 3 is a schematic view showing an arrangement of a retina projection device in FIG. 2.

As shown in FIG. 3, the retina projection device 20 in FIG. 2 comprises, e.g. an acoustic optical type optical deflector and the horizontal scanning portion 21 in the retina projection device 20 in FIG. 2 comprises a horizontal acoustic optical deflection device 21a which is disposed horizontally and performs a horizontal scanning and a λ/4 wavelength plate 21b (λ is a wave length) which is provided at an irradiating side of the horizontal acoustic optical deflection device 21a. The vertical scanning portion 22 in the retina projection device 20 in FIG. 2 is disposed vertically relative to the paper surface at the output side of the λ/4 wavelength plate and comprises the vertical acoustic optical deflection device 22a for performing a vertical scanning. Provided at the output side of the vertical acoustic optical deflection device 22a is the optical system 23 in FIG. 2 having the beam splitters 23a and 23b and the convergent lens 23c.

As shown in FIG. 3, the horizontal acoustic optical deflection device 21a for optical scanning comprises an acoustic optical medium 21a-1 made of $PbMoO_4$, $TeO_2$, etc., a transducer 21a-2 which is attached to one end of the acoustic optical medium 21a-1 and made of a piezoelectric material such as ZnO, $LiNbO_3$, etc. and an ultrasonic wave absorption layer 21a-3 which is provided at the other end of the acoustic optical medium 21a-1. The acoustic optical medium 21a-1 varies voltage or frequency of the horizontal deflection signal S40H to be applied to the transducer 21a-2 utilizing such an acoustic-optical effect that light is diffracted by the acoustic optical medium 21a-1 spacially waving in refractive index (forming a diffraction grating) which is generated by an ultrasonic wave propagating in the acoustic optical medium 21a-1, thereby performing the horizontal scanning by varying diffracting direction of the incident beam S10. The vertical acoustic optical deflection device 22a has the same structure as the horizontal acoustic optical deflection device 21a and it varies the diffracting direction of the beam by varying the voltage or frequency of the vertical deflection signal S40V and performs the vertical scanning, thereby emitting the beam S20.

The convergent lens 23c in the optical system 23 converges the beam S20 which is sent from the vertical acoustic optical deflection device 22a through the beam splitters 23a and 23b and focuses the converged beam S20 on the pupil 2 of the surface of the eyeball 1. The beam S20 which is focused on the pupil 2 is reversed by the crystalline lens 3 of the eyeball 1 and an image is formed on the retina 4 where it is scanned in the horizontal and vertical directions.

The diameter of the pupil 2 of the eyeball 1 is large in the dark and small in the bright due to physiological function. It is desirable physiologically for men to see an object easily with less fatigue when the diameter of beam S20 which is emitted from the convergent lens 23c is equal to or larger than that of the pupil 2 and is smaller than that of the crystalline lens 3.

Figure 4:
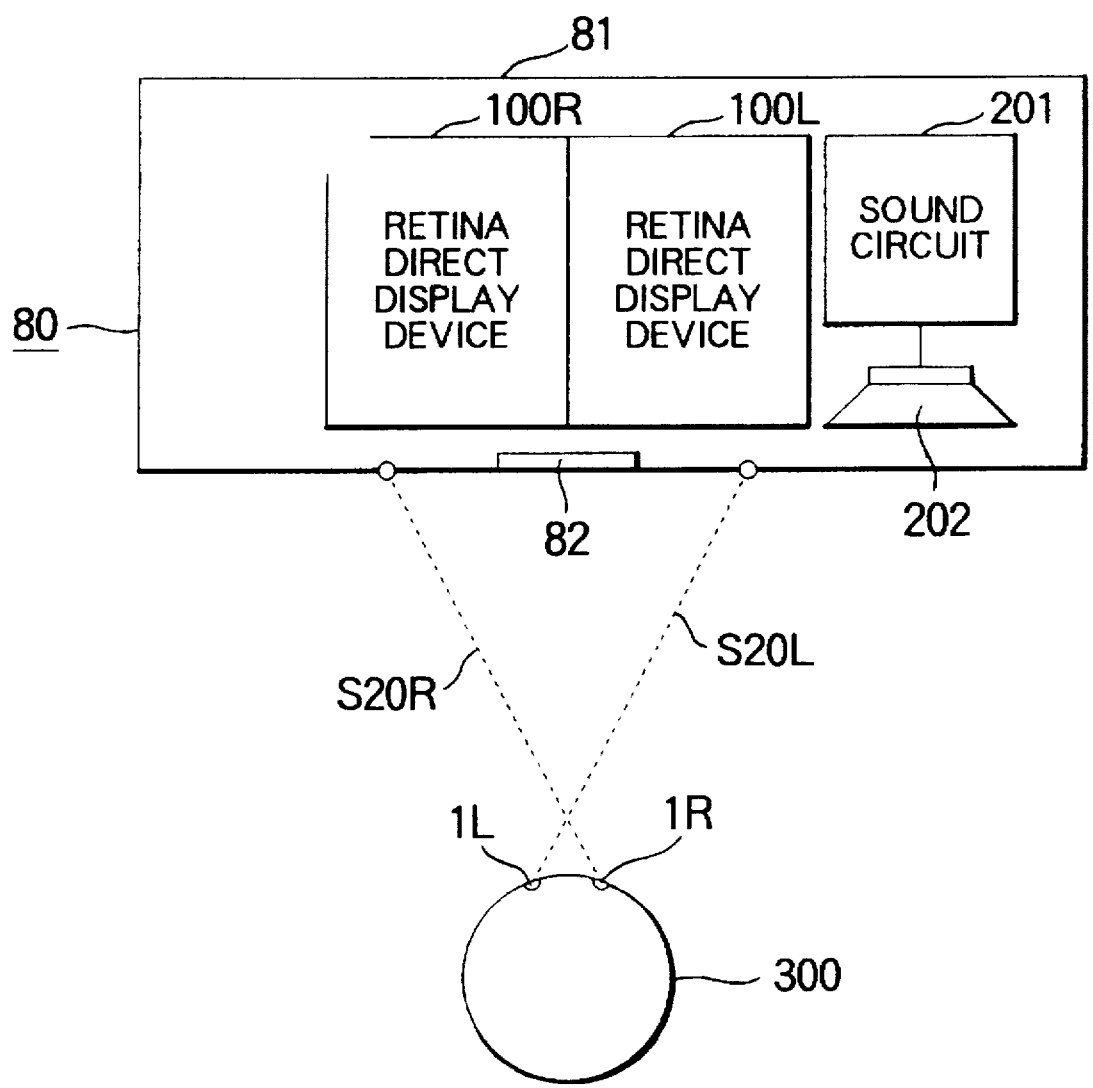
FIG. 4 is a schematic block diagram of a television receiver on which the projection type direct retina display device is mounted.

As shown in FIG. 4, a television receiver 80 on which the projection type direct display device in FIG. 1 is mounted includes a cabinet 81 and a mirror 82 attached to the outside of the cabinet 81 for initial setting of the projecting distance. There are provided two retina direct display devices 100R and 100L each composed of the projection type direct display device in FIG. 1. Two beams S20R and S20L of visible light for right and left eyes are emitted from the retina direct display devices 100R and 100L in crossing in a crossing method and they are incident to two eye balls 1R and 1L of an observer 300 who sits on a given position in front of the cabinet 81.

An acoustic device is provided inside the cabinet 81. The acoustic device comprises a sound circuit 201, a speaker 202, and the like. The sound circuit 201 detects a sound signal which is externally applied thereto and amplifies it and operates the speaker 202.

Described hereinafter an operation of projection type retina direct display devices 100, 100R and 100L having the aforementioned arrangements and an operation of the television receiver 80 on which these devices are mounted.

As shown in FIG. 4, in case that the observer 300 observes a video image such as television signal or a video signal or the like by the television receiver 80, the initial setting of the projecting distance is performed when the observer 300 sits on a given position so that his face can be seen while looking the mirror 82 provided on the cabinet 81. The externally applied sound signal is detected and amplified by the sound circuit 201 provided inside the cabinet 81 and the speaker 202 is operated by an output signal from the sound circuit 201, thereby outputting sound. The externally applied video signal IN is converted into the beam S10 of primary colors of red, green and blue by the visible light conversion device 10 in each of the retina direct display devices 100R and 100L respectively provided inside the cabinet 81 and the beam S10 is then sent to the retina projection device 20.

In the retina projection device 20 in FIG. 2, the horizontal acoustic optical deflection device 21a in FIG. 3 constituting the horizontal scanning portion 21 subjects the incident beam S10 to a horizontal scanning based on the horizontal deflection signal S40H which is supplied from the eye movement tracking controller 40. The beam S10 which was thus subjected to the horizontal scanning is sent to the vertical acoustic optical deflection device 22a through the λ/4 wavelength plate 21b. The vertical acoustic optical deflection device 22a subjects the incident beam S20 to the vertical scanning based on the vertical deflection signal S40V which is supplied from the eye movement tracking controller 40. The beam S20 which was thus subjected to the vertical scanning transmits the beam splitters 23a and 23b and it is emitted from the convergent lens 23c.

Two beams S20R and S20L which are deflected by the retina projection device 20 in each of the retina direct display devices 100R and 100L in FIG. 4 are emitted from the retina projection device 20 in crossing. The two beams S20R and S20L pass the pupils 2 and the crystalline lenses 3 of both eyeballs 1R and 1L of both eyes of the observer 300 and an image is formed on the retinas 4. The two beams S20R and S20L are subjected to the horizontal and vertical scanning directly on the retinas 4 so that the observer 300 can enjoy a plane image which is emitted from the retina direct display devices 100R and 100L due to afterimage effect of the eyes.

At this time, the irradiation beams S50 which are emitted from the irradiation light sources 50 provided in each of the retina direct display devices 100R and 100L are reflected on each beam splitter 23a and they are sent to both eyeballs 1R and 1L. Each beam S50 is reflected on both eye balls 1R and 1L and is sent to each beam splitter 23b in the retina direct display devices 100R and 100L. The reflected irradiation beam S23b thus sent to each beam splitter 23b is reflected on each beam splitter 23b and is converted into an electric signal by each photoelectric conversion device 60 and the thus converted electric signal is sent to each picture processing device 70.

In the picture processing device 70 of FIG. 2 in each of the retina direct display devices 100R and 100L, an output signal of the photoelectric conversion device 60 is sampled and held by the sample-and-hold circuit 71 and it is subjected to AGC and γ compensation by the compensating circuit 72, then it is converted into a digital signal by the A/D converter 73. The resultant digital signal is sent to the eye movement detector 74 and the field memory 75. The image signal of the pupil 2 of one previous frame is stored in the field memory 75. The eye movement detector 74 compares the image signal of the pupil 2 of one previous frame which has been read by the field memory 75 with the image signal of the pupil 2 of the present frame which is supplied from the A/D converter 73, thereby obtaining the direction and quantity of the movement of the pupil 2 (i.e. movement vector) so as to output the horizontal and vertical movement detection signals corresponding to this movement vector.

The horizontal movement detection signal output from the eye movement detector 74 is converted into the analog signal by the D/A converter 77H. The resultant converted horizontal movement detection signal S70H is sent to the bias generating circuit 41H in the eye movement tracking controller 40. Further, the vertical movement detection signal output from the eye movement detector 74 is converted into the analog signal by the D/A converter 77V. The resultant converted vertical movement detection signal S70V is sent to the bias generating circuit 41V in the eye movement tracking controller 40.

The synchronous circuit 30 in each of the retina direct display devices 100R and 100L extracts the horizontal synchronous signal S30H and vertical synchronous signal S30V from the applied video signal IN and supplies the resultant extracted horizontal synchronous signal S30H and the vertical synchronous signal S30V to the bias generating circuits 41H and 41V. The bias generating circuit 41H receives the horizontal synchronous signal S30H which is output from the synchronous circuit 30 and the horizontal movement detection signal S70H which is output from the D/A converter 77H and outputs the bias signal S41H having the level corresponding to the horizontal movement detection signal S70H to the sawtooth generating circuit 42H. The sawtooth generating circuit 42H overlays the input bias signal S41H on the sawtooth wave which is generated therein, thereby outputting the sawtooth wave signal S42H so that the oscillating frequency of the VCO 43H is varied in response to the level of voltage of the sawtooth wave signal S42H. An output signal of the VCO 43H is driven by the driver 44H so that the horizontal deflection signal S40H is output from the driver 44H and is applied to the horizontal acoustic optical deflection device 21a of the horizontal scanning portion 21.

Whereupon, the bias generating circuit 41V receives the vertical synchronous signal S30V which is output from the synchronous circuit 30 and the vertical movement detection signal S70V which is output from the D/A converter 77V and outputs the bias signal S41V corresponding to the level of the vertical movement detection signal S70V to the sawtooth generating circuit 42V. The sawtooth generating circuit 42V overlays the input bias signal S41V on the sawtooth wave which is generated therein, thereby outputting the sawtooth wave signal S42V so that the oscillating frequency of the VCO 43V is rallied in response to the level of voltage of the sawtooth wave signal S42V. An output signal of the VCO 43V is driven by the driver 44V so that the vertical deflection signal S40V is output from the driver 44V and is applied to the vertical acoustic optical deflection device 22a in the vertical scanning portion 22. As a result, the direction of beam emitted from the convergent lens 23c constituting the optical system 23 is controlled.

Accordingly, when the pupils 2 of both eye balls 1R and 1L of the observer 300 move during the observation of the video image, the beams S20R and S20L which are emitted from each of the retina direct display devices 100R and 100L are moved following the movement of the pupils 2. As a result, the retinas are raster scanned by the beams S20R and S20L through each of the pupils 2 and the crystalline lenses 3 of both the eye balls 1R and 1L of the observer 300.

As mentioned above, according to the first embodiment of the invention, the following functions and effects (a) to (d) are obtained.

(a) Since the video signal IN of the high quality is converted into the beam S10 by the visible light conversion device 10 in the retina direct display devices 100R and 100L and the retina 4 is directly raster scanned by the beam S10, it is possible to obtain the picture quality with less deterioration but high resolution compared with that using the conventional video plate.

(b) Since the retinas are directly raster scanned instead of the conventional image plate, the conventional video plate can be omitted so that the device can be reduced in its size and in the manufacturing cost.

(c) The eye movement tracking is improved in its accuracy since it can be performed using the irradiation beam S50 which is irradiated from the irradiation light source 50.

(d) In case of using a laser beam as the irradiation beam S50 of the beams S10 and S20, the raster scanning and the eye movement tracking are respectively improved in their accuracy since the laser beam is high in its convergence. However, it is advisable to use the laser beam of low energy in view of safety for the eyes. On the other hand, if the beam of incoherent visible light which is low in its convergence is used, the raster scanning and eye movement tracking are low in their accuracy compared with the laser beam but it is safer for the eyes.

Figure 5:
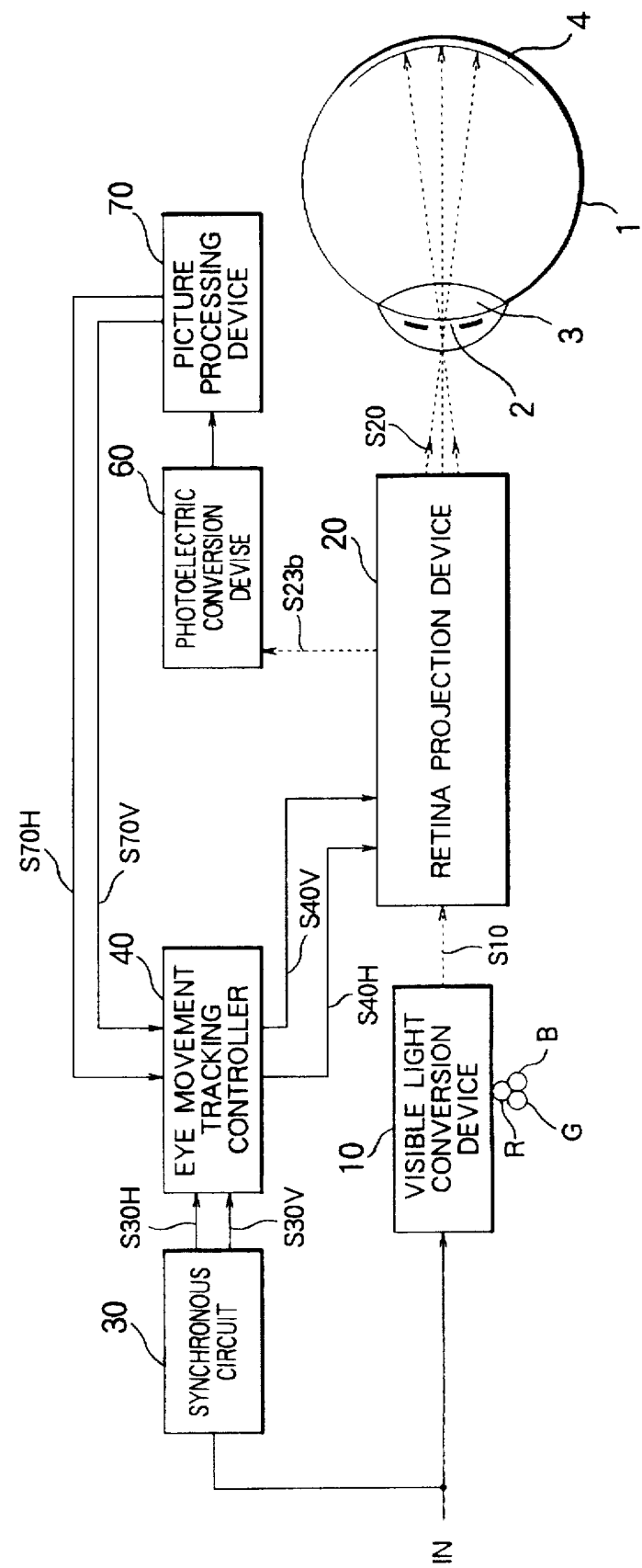
FIG. 5 is a block diagram showing an arrangement of a projection type retina direct display device according to a second embodiment of the invention.

Second Embodiment (FIG. 5)

A projection type retina direct display device according to a second embodiment of the invention will be described with reference to FIG. 5. Elements which are the same as those of the first embodiment are denoted at the same numerals.

The retina direct display device of the second embodiment is different from that of the first embodiment in respect that the former dispenses with the irradiation light source 50 and the beam splitter 23a in FIGS. 1 and 2 and that the former tracks the movement of the pupil 2 using the beam S20 emitted from the retina projection device 20 to the eyeball 1.

That is, in the retina direct display device according to the second embodiment, when the beam S20 is emitted from the retina projection device 20 so that the retina is raster scanned, the reflected beam of the beam S20 from the eyeball 1 is reflected on the beam splitter 23b in FIG. 2, and the reflected irradiation beam S23b is changed into an electric signal by the photoelectric conversion device 60. The converted electric signal is supplied to the picture processing device 70. The horizontal movement detection signal S70H and vertical movement detection signal S70V are detected by the picture processing device 70. The direction of the beam emitted from the retina projection device 20 is controlled by the eye movement tracking controller 40 based on horizontal movement detection signal S70H and vertical movement detection signal S70V so as to track the direction of the movement of the pupil 2.

According to the second embodiment, it is possible to obtain the substantially the same functions and effects as those of the first embodiment and dispense with the irradiation light source 50 and the beam splitter 23a and also perform the eye movement tracking using the reflected beam of the beam S20 which is emitted from the retina projection device 20 so that the arrangement of the eye movement tracking means can be simplified.

Figure 6:
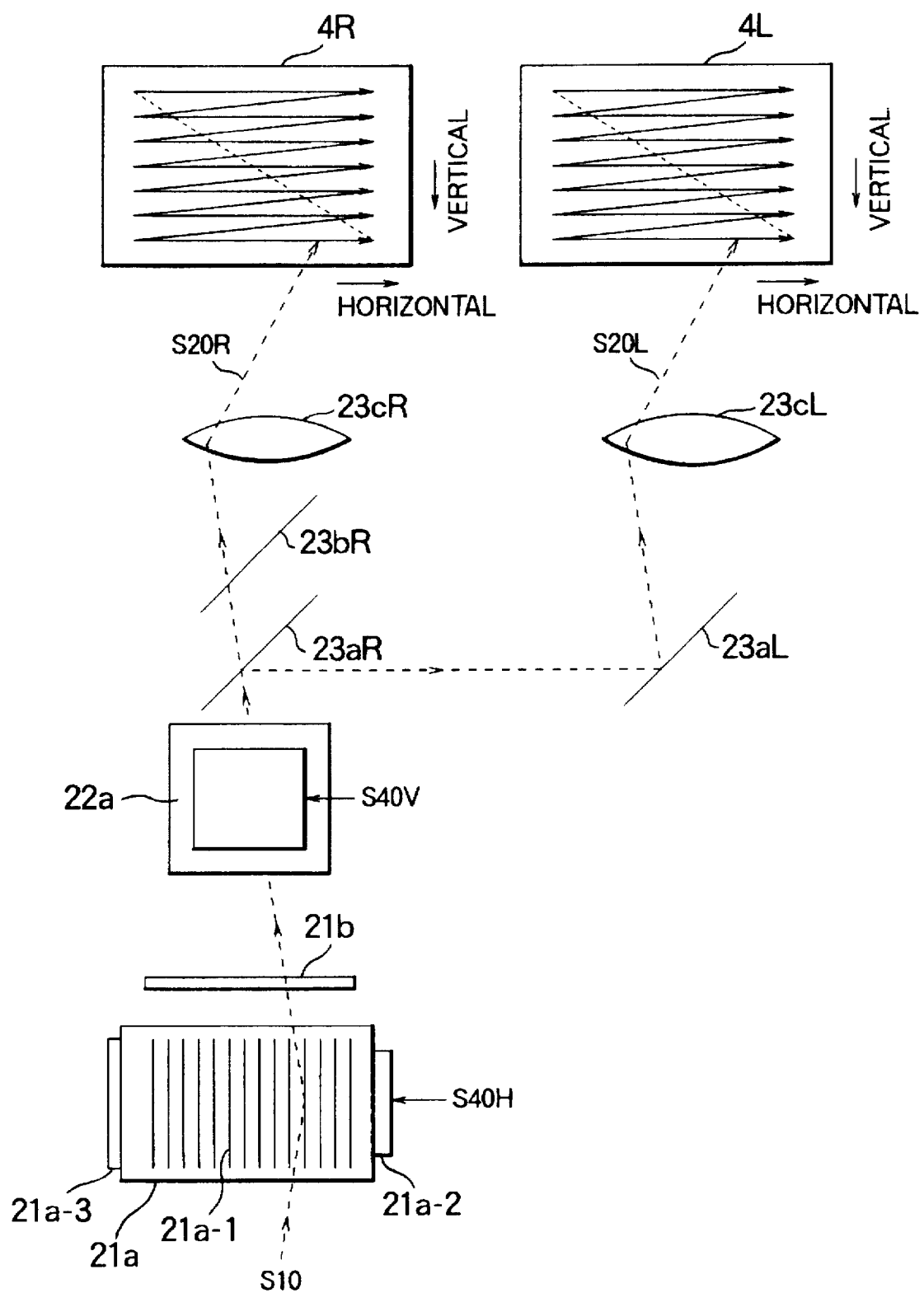
FIG. 6 is a schematic view showing an arrangement of a retina projection device according to a third embodiment of the invention.

Third Embodiment (FIG. 6)

A projection type retina direct display device according to a third embodiment of the invention will be described with reference to FIG. 6. Elements which are the same as those of the first embodiment are denoted at the same numerals.

The television receiver 80 in FIG. 4 is provided with two retina direct display devices 100R and 100L for right and left eyes. These retina direct display devices 100R and 100L comprise the devices as shown in FIGS. 1 and 5. The eye movement tracking means comprising the synchronous circuit 30, eye movement tracking controller 40, photoelectric conversion device 60 and picture processing device 70 is sufficient to be provided only in either the retina direct display device 100R or the retina direct display device 100L since the movements of the pupils 2 of both eyes are substantially the same. Accordingly, a circuit arrangement can be simplified if the horizontal deflection signal S40H and vertical deflection signal S40V respectively output from a common eye movement tracking controller 40 which is provided in either the retina direct display device 100R or retina direct display device 100L are applied to the retina projection device 20 in each of the retina direct display devices 100R and 100L.

If it is intended to further simplify the circuit arrangement, the retina direct display devices 100R and 100L in FIG. 4 is replaced by one common retina direct display device as shown in FIG. 1 or FIG. 5 and the retina projection device 20 in the common retina direct display device is structured to be different from that in FIG. 3 so that two beams S20R and S20L for right and left eyes are emitted from the common retina projection device 20. An arrangement of the common retina projection device 20 is shown in FIG. 6.

The retina projection device 20 in FIG. 6 is provided with the vertical scanning portion 22 comprising the horizontal scanning portion 21 composed of the horizontal acoustic optical deflection device 21a and the λ/4 wavelength plate 21b like that in FIG. 3 and the vertical acoustic optical deflection device 22a like that in FIG. 3. The retina projection device 20 also includes the optical system 23 provided at the emitting side of the vertical scanning portion 22 but the arrangement of the optical system 23 is different from that in FIG. 3.

The optical system 23 in FIG. 6 comprises beam splitters 23aR and 23bR for half mirror, etc. and the beam splitter 23aL for mirror, etc. and a convergent lens 23cR for right eye and a convergent lens 23cL for left eye. The beam splitter 23aR has a function to permit the beam emitted from the vertical acoustic optical deflection device 22a to transmit in the direction of the convergent lens 23cR and also has a function to reflect the same beam in the direction of the beam splitter 23aL. The beam splitter 23aL has a function to reflect the reflected light from the beam splitter 23aR in the direction of the convergent lens 23cL. The convergent lens 23cR has a function to converge the beam S20R which transmitted the beam splitters 23aR and 23bR and supplies the converged beam S20R to the right eye. The convergent lens 23cL has a function to converge the beam S20L which is reflected on the beam splitter 23aL and supplies the converged beam S20L to the left eye.

In the retina projection device 20 as shown in FIG. 6 like that in FIG. 3, the beam S10 which is emitted from the visible light conversion device 10 is subjected to the horizontal and vertical scanning by the horizontal acoustic optical deflection device 21a and vertical acoustic optical deflection device 22a based on the horizontal deflection signal S40H and the vertical deflection signal S40V which are respectively applied from the eye movement tracking controller 40 in FIGS. 1 and 5. The beam emitted from the vertical acoustic optical deflection device 22a transmits the beam splitters 23aR and 23bR and it is converged by the convergent lens 23cR. The right retina 4R is directly raster scanned by the converged beam S20R in the horizontal and vertical directions. The beam emitted from the vertical acoustic optical deflection device 22a is reflected on the beam splitter 23aR and it is further reflected on the beam splitter 23aL. Thereafter, the reflected beam is converged by the convergent lens 23cL and the left retina 4L is directly scanned by the converged beam S20L in the horizontal and vertical directions. As a result, the observer 300 can enjoy the plane image due to afterimage effect of the eyes.

If the retina projection device 20 provided in the retina direct display devices 100R and 100L is structured to be commonly used as shown in FIG. 6, the device can be more simplified.

Although in the first, second and third embodiments as explained above, the right retina 4R and left retina 4L are directly raster scanned by the beams S20R and S20L so as to perform the video display of the plane image, they can be applied to the video display of the stereoscopic image, arrangement of which will be described with reference to the following fourth embodiment.

Figure 7:
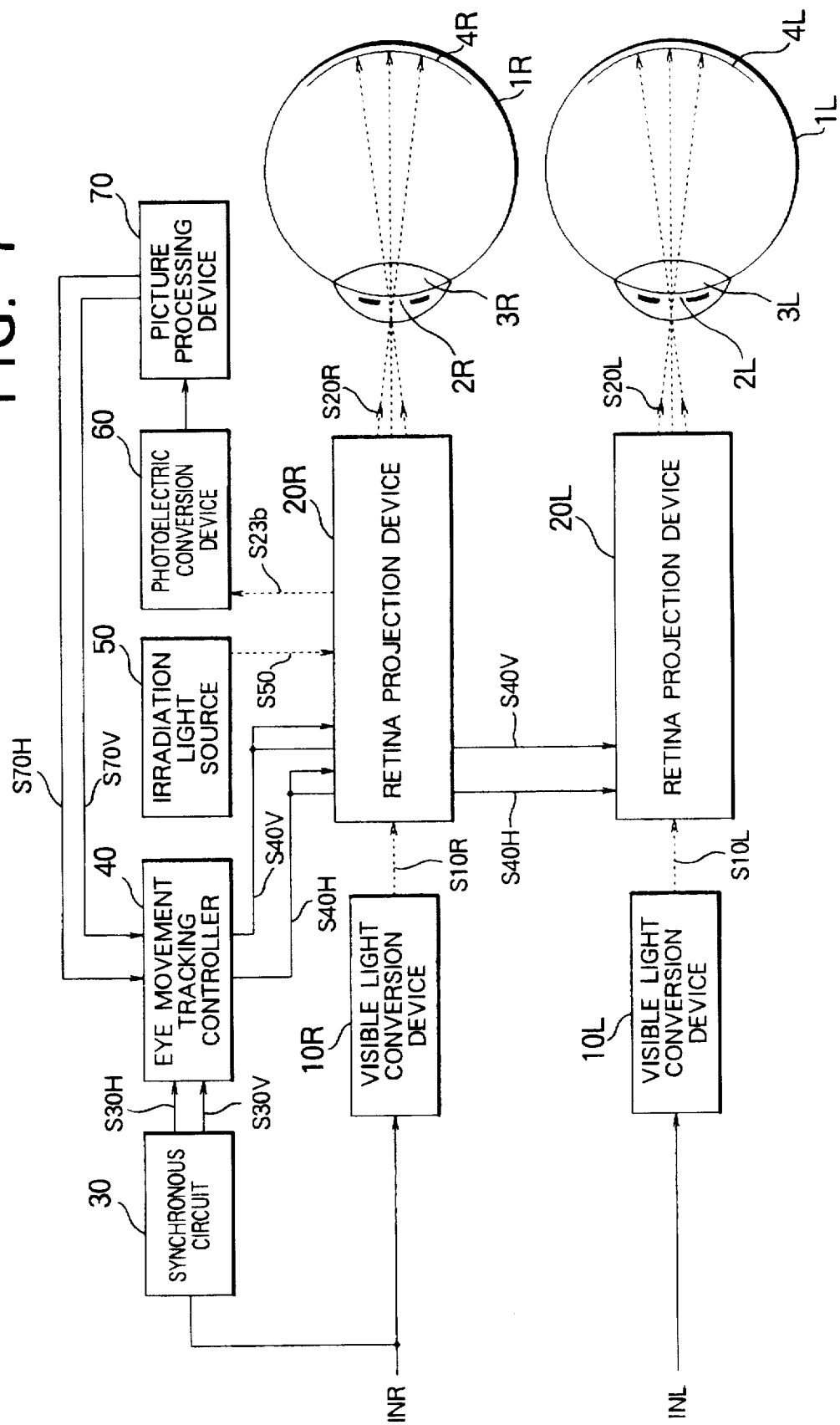
FIG. 7 is a block diagram showing an arrangement of a direct display device for stereoscopic display according to a fourth embodiment of the invention.

Fourth Embodiment (FIG. 7)

A device in FIG. 7 showing a fourth embodiment of the invention is a projecting type retina direct display device for displaying the video image of stereoscopic image. Elements which are the same as those in FIG. 1 are denoted at the same numerals.

The projection type retina direct display device in FIG. 7 is provided with the eye movement tracking means comprising the synchronous circuit 30 which are used in common for right and left eyes, eye movement tracking controller 40, irradiation light source 50, photoelectric conversion device 60 and picture processing device 70 like those in FIG. 1.

Further, there are provided a visible light conversion device 10R and a retina projection device 20R for a video signal INR for right eye and the visible light conversion device 10L and a retina projection device 20L for a video signal IN for left eye.

The visible light conversion device 10R is a device for converting the video signal INR into the beam S10R like the visible light conversion device 10 in FIG. 1. The retina projection device 20R is connected to an output side of the visible light conversion device 10R. The retina projection device 20R is a device like the retina projection device 20 in FIG. 1 for deflecting a beam S10R, which is emitted from the visible light conversion device 10R by the two-dimensional scanning means, in the horizontal and vertical directions based on the horizontal deflection signal S40H and vertical deflection signal S40V which are applied by the eye movement tracking controller 40 and for supplying the deflected beam S20R to the right eyeball 1R of the right eye by the optical system.

The visible light conversion device 10L is a device for converting the video signal INL for left eye into the beam S10L of visible light for right eye like the visible light conversion device 10 in FIG. 1. The retina projection device 20L is connected to an output side of the visible light conversion device 10L. The retina projection device 20L is a device like the retina projection device 20R for deflecting a beam S10L, which is emitted from the visible light conversion device 10L by the two-dimensional scanning means, in the horizontal and vertical directions based on the horizontal deflection signal S40H and vertical deflection signal S40V and for supplying the deflected beam S20L of visible light for left eye to the left eyeball 1L of the left eye by the optical system.

If the projection type retina direct display device is provided in the cabinet 81 instead of the retina direct display devices 100R and 100L as shown in FIG. 4, it is possible to structure the television receiver capable of displaying a stereoscopic image.

In the projection type retina direct display device as shown in FIG. 7, if the video signals INR and INL which are photographed in different angles are input to each of the visible light conversion devices 10R and 10L, they are converted into the beams S10R and S10L by the visible light conversion devices 10R and 10L and supplied to the retina projection devices 20R and 20L. In the retina projection device 20R, the incident beam S10R is deflected horizontally and vertically based on the horizontal deflection signal S40H and vertical deflection signal S40V which are supplied from the eye movement tracking controller 40. The deflected beam S20R is emitted from the optical system in the retina projection device 20R and the right retina 4R is raster scanned by the deflected beam S20R through the pupil 2R.

The video signal INL is converted into the beam S10L by the visible light conversion device 10L and supplied to the retina projection device 20L. The retina projection device 20L deflects the incident beams S10L horizontally and vertically based on the horizontal deflection signal S40H and vertical deflection signal S40V which are supplied from the eye movement tracking controller 40. The deflected beam S20L is emitted from the optical system in the retina projection device 20L and the left retina 4L is raster scanned by the beam S20L through the left pupil 2L. As a result, the observer 300 can enjoy the stereoscopic image.

In the projection type retina direct display device, the eye movement tracking device means comprising the synchronous circuit 30, eye movement tracking controller 40, irradiation light source 50, beam splitters 51 and 52, photoelectric conversion device 60 and picture processing device 70 may be provided at the side of the video signal INL or provided only at the side of the video signal INL. The irradiation light source 50 and the beam splitter 23a in FIG. 2 may be omitted as shown in FIG. 5 so that the arrangement of the device can be more simplified.

Figure 8:
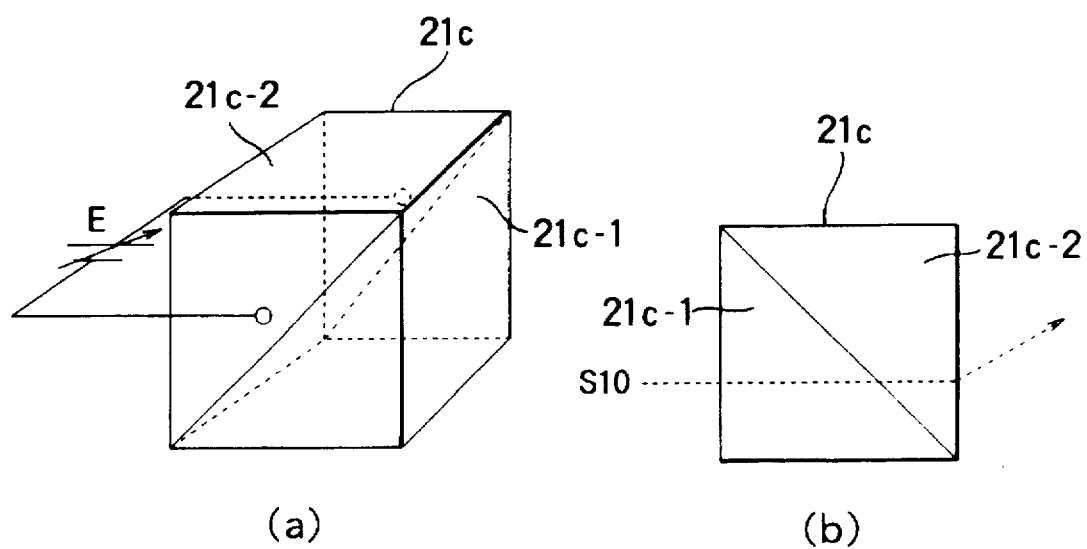
FIG. 8(a) is a perspective view of a scanning portion of a retina projection device according to a fifth embodiment of the invention.
FIG. 8(b) is a side view of the scanning portion of the same device.

Fifth Embodiment (FIG. 8(a) and 8(b))

A fifth embodiment of the retina direct display device as shown in FIGS. 8(a) and 8(b) includes another arrangement of the horizontal scanning portion 21 and vertical scanning portion 22 in FIG. 2.

The horizontal scanning portion 21 and vertical scanning portion 22 in FIG. 2 may be structured by two electrooptic optical deflectors 21c for performing horizontal and vertical scanning as shown in FIGS. 8(a) and 8(b).

The electrooptic optical deflector 21c varies the refractive index by applying and electric field to an electrooptic crystal, thereby deflecting an incident light. In the electrooptic optical deflector 21c, two prisms 21c-1 and 21c-2 made of a material having a large electrooptic coefficient such as $KH_2PO_4$(KOP), $LiNbO_3$ are coupled to the electrooptic optical deflector 21c and modulating voltage E (i.e., the horizontal deflection signal S40H C) and vertical deflection signal S40V) is applied to these prisms 21c-1 and 21c-2.

In such optical deflector 21c, if the electric field is applied to the prisms 21c-1 and 21c-2 by the modulating voltage E, the refractive index is varied so that the emitting direction of the incident beam S10 can be deflected by varying the modulating voltage E. If two optical deflectors 21c are connected to each other in series for horizontal and vertical scanning, the beam S10 which is emitted from the visible light conversion device 10 in FIG. 2 can be deflected horizontally and vertically.

Figure 9:
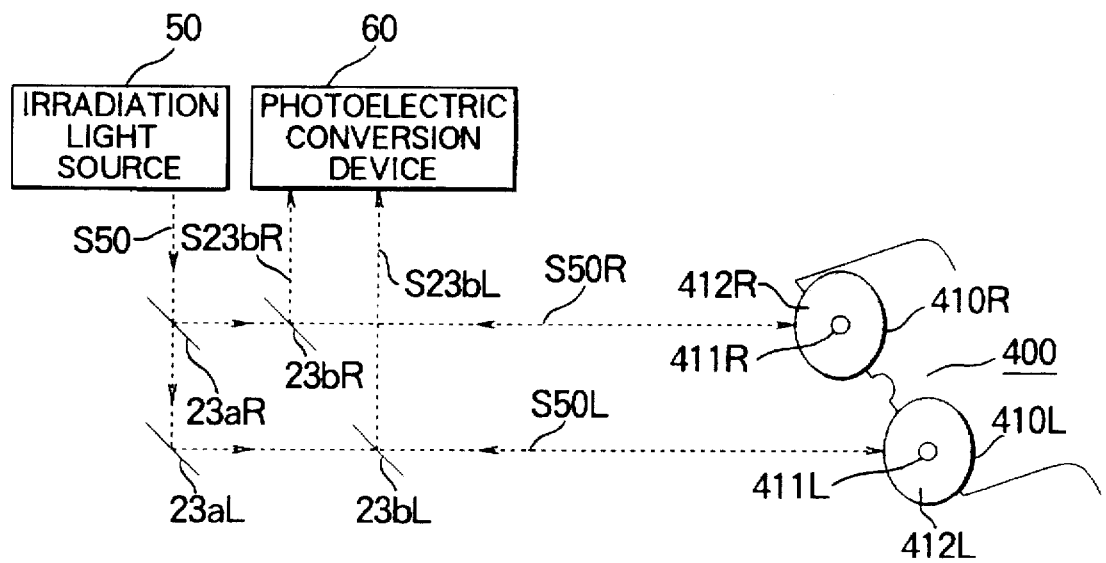
FIG. 9 is a view showing an arrangement of an eye movement tracking means according to a sixth embodiment of the invention.

Sixth Embodiment (FIG. 9)

A sixth embodiment of the retina direct display device as shown in FIG. 9 includes another arrangement of the eye movement tracking means. Elements which are the same as those in FIG. 2 showing the first embodiment are denoted at the same numerals.

In the television receiver 80 as shown in FIG. 4, both the retina direct display devices 100R and 100L are provided and each of the retina direct display device 100R is structured by, e.g., the projection type retina direct display device as shown in FIG. 2. In this case, the irradiation light source 50, beam splitters 23a and 23b and photoelectric conversion device 60 constituting the eye movement tracking means are provided for each of the retina direct display devices 100R and 100L. The sixth embodiment simplifies the arrangement of the eye movement tracking means.

In the eye movement tracking means in FIG. 9, there are provided the beam splitters 23aR and 23aL for splitting the irradiation beam S50 emitted from the irradiation light source 50 into irradiation beams S50R and S 50L for right and left eyes. There are disposed the beam splitters 23bR and 23bL on reflection optical paths of the beam splitters 23aR and 23aL and there is provided the photoelectric conversion device 60 on reflection paths of the beam splitters 23bR and 23bL.

A pair of spectacles 400 are used for reflecting the irradiation beams S50R and S50L which transmitted the beam splitters 23bR and 23bL. The pair of spectacles 400 have right and left lenses 410R and 410L. There are formed transparent portions 411R and 411L on central portions of the right and left lenses 410R and 410L for transmitting the beam S20 (S20R and S20L) emitted from the retina projection device 20 in FIG. 2. There are also formed reflection portions 412R and 412L at the periphery of the transparent portions 411R and 411L. In such eye movement tracking means, when the irradiation beam S50 is emitted from the irradiation light source 50, the irradiation beam S50 is split into the irradiation beams S50R and S50L by the beam splitters 23aR and 23aL. The irradiation beam S50R transmits the beam splitter 23bR and it is sent to the right lens 410R while the irradiation beam S50L transmits the beam splitter 23bL and it is sent to the left lens 410L. The irradiation beam S50R is reflected on the reflection portion 412R of the right lens 410R and then it is reflected on the beam splitter 23bR and the reflected irradiation beam S23bR is sent to the photoelectric conversion device 60. Likewise, the irradiation beam S50L is reflected on the reflection portion 412L of the left lens 410L and then it is reflected on the beam splitter 23bL and the reflected irradiation beam S23bL is sent to the photoelectric conversion device 60.

In the photoelectric conversion device 60, the irradiation beams S23bR and S23bL from the beam splitters 23bR and 23bL are converted into electric signals so that the horizontal movement detection signal S70H and vertical movement detection signal S70V are detected by the picture processing device 70 in FIG. 2. The eye movement tracking controller 40 permits the direction of the beam emitted from the retina projection device 20 to track the moving direction of the pair of spectacles 400 based on the horizontal movement detection signal S70H and vertical movement detection signal S70V.

The following functions and effects can be obtained by the sixth embodiment.

(a) Since the irradiation beam S50 emitted from the irradiation light source 50 is reflected on the reflection portions 412R and 412L of the pair of spectacles 400 using the pair of spectacles 400, and the reflected beam is converted into the electric signal by the photoelectric conversion device 60, it is possible to obtain accurate reflected beam and perform the eye movement tracking with high accuracy.

(b) Although there are respectively provided the visible light conversion device 10 and retina projection device 20 in both the retina direct display devices 100R and 100L in FIG. 4, the visible light conversion device 10 and retina projection device 20 can be commonly used by both the retina direct display devices 100R and 100L if the beam splitters 23a and 23b in the retina projection device 20 are replaced by the beam splitters 23aR, 23aL, 23bR and 23bL in FIG. 9. In such an arrangement, the beam S20 emitted from the retina projection device 20 in FIG. 2 is split into the right eye side and the left eye side by the beam splitters 23aR and 23aL, and the split beams pass through the beam splitters 23bR and 23bL and convergent lenses, and further they pass through the transparent portions 411R and 411L of the right lens 410R and left lens 410L so that the retinas of the both eyes are raster scanned by these beams, thereby enabling the observation of video image.

Figure 10:
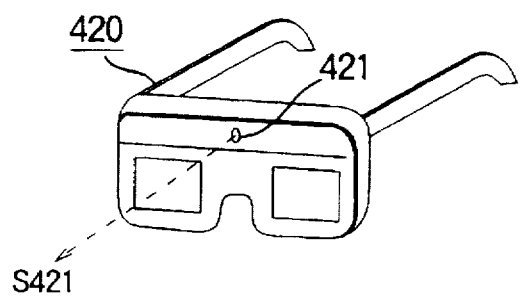
FIG. 10 is an arrangement of an eye movement tracking means according to a seventh embodiment of the invention.

Seventh Embodiment (FIG. 10)

A retina direct display device according to a seventh embodiment as shown in FIG. 10 includes another arrangement of the eye movement tracking means.

In the eye movement tracking means in FIG. 10, light-emitting element 421 for emitting a beam S421 such as infrared light is provided on a spectacle type frame 420 which the observer 300 wears in FIG. 4 instead of the irradiation light source 50, beam splitters 23a and 23b respectively as shown in FIG. 2, and the irradiation light source 50, beam splitters 23aR and 23aL, beam splitters 23bR and 23bL, and pair of spectacles 400 respectively as shown in FIG. 9.

In the seventh embodiment, when the observer 300 in FIG. 4 wears the spectacle type frame 420, the beam S421 is emitted from the light-emitting element 421 provided on the spectacle type frame 420. If the beam S421 is converted into an electric signal by the photoelectric conversion device 60 in FIG. 2, it is used for performing the eye movement tracking so as to track the movement of the spectacle type frame 420 worn by the observer 300.

In the eye movement tracking means using such spectacle type frame 420, the irradiation light source 50, beam splitters 23aR and 23aL, beam splitter 23b, beam splitters 23bR and 23bL can be dispensed with, thereby more simplifying the arrangement of the eye movement tracking means.

The first to seventh embodiments as set forth above clarify the technical content of the invention, and hence the present invention is neither limited to the first to seventh embodiments nor narrowly interpreted thereby. Accordingly, it is possible to modify the invention variously and work the invention within the sprit of the invention and the scope of the claims set forth hereunder. As modifications of the invention, there are followings (1) to (6).

(1) Although the externally applied video signals IN, video signals INR and INL are converted into the beams S10, S10R and S10L of primary colors of red, green and blue by the visible light conversion devices 10, 10R and 10L in FIGS. 1, 5 and 7 for performing color display. However, in case of monochrome display, the video signals IN, INR and INL may be converted into one kind of beam of S10, S10R and S10L representing white and black. In such monochrome display, the visible light conversion devices 10, 10R and 10L and the retina projection devices 20, 20R and 20L may be structured to perform the monochrome conversion and projection, thereby more simplifying the device.

(2) The horizontal scanning portion 21 and vertical scanning portion 22 in FIG. 2 may be structured by another arrangement such as a mechanical optical deflector, for example vertical and horizontal scanning mirrors which are used in galvanoscanner, scanning laser ophthalmoscope.

(3) Although the two crossed beams S20R and S20L are emitted from the cabinet 81 in FIG. 4, the two beams S20R and S20L may be emitted toward the observer 300 in parallel with each other. Although the initial setting of the distance between the retina projection means and the observer 300 is performed using the mirror 82 provided in the cabinet 81, it may be performed by other means, for example, fixing the position where the observer 300 sits.

(4) The eye movement tracking means may be structured other than those as explained in the aforementioned embodiments. For example, the right and left lenses 410R and 410L of the pair of spectacles 400 are replaced by other reflection structures so that the movement of the pupils is detected and the directions of beams emitted from the retina projection devices 20, 20R and 20L tracks the movements of the pupils with more accuracy. The face of the observer 300 is photographed by a video camera, etc. and the resultant photographed image of the face is stored in the memory and then the movement of the pupils may be detected using the picture processing device 70 comprising the CPU, etc., thereby performing the eye movement tracking.

(5) The irradiation light source 50, beam splitters 23a, 23aR, 23aL, 23bR, 23bL, photoelectric conversion device 60, picture processing device 70 and eye movement tracking controller 40, etc., respectively as shown in FIGS. 1, 2, 5, 7 or 9 may be provided inside the retina projection devices 20, 20R and 20L.

(6) Although the aforementioned embodiments describe the projection type retina direct display device having the retina direct display devices 100R and 100L which are accommodated in the cabinet 81, for example, as shown in FIG. 6, it may be replaced by a spectacle type structure in which the retina direct display devices 100R and 100L are attached to the spectacle type frame 420. In such spectacle type structure, the distance between the retina projection devices 20, 20R and 20L and the pupils 2R and 2L of the eyeballs 1R and 1L is reduced, thereby improving the eye movement tracking accuracy of the eye movement tracking means and also more simplifying the structure of the eye movement tracking means. Further, the speaker 202 in FIG. 4 is replaced by an ear phone, etc. and the year phone, etc. and the sound circuit 201 may be attached to the spectacle type frame 420 in FIG. 10.

What is claimed is:

1. A retina direct display device comprising:
   a visible light conversion means for converting a video signal including a horizontal synchronous signal and a vertical synchronous signal into a beam of visible light;
   a retina projection means having:
      a two-dimensional scanning means for deflecting the beam which is converted by the visible light conversion means in horizontal and vertical directions in response to a horizontal deflection signal and a vertical deflection signal, and
      an optical system for projecting a beam of visible light which is deflected by the two-dimensional scanning means on both eyes of a viewer so that retinas are raster scanned through pupils of the both eyes by the projected beam; and
   an eye movement tracking means having
      a synchronous circuit for extracting the horizontal synchronous signal and the vertical synchronous signal included in the video signal,
      a photoelectric conversion device for converting a reflection light beam or an irradiation light beam which is sent from the eye side of one of or both of the right and left eye into an electric signal,
      a picture processing device for comparing an image data of one of or both of the right and left pupil of the present frame and an image data of the pupil of one previous frame in response to the electric signal which is converted by the photoelectric conversion device and detecting the direction and quantity of the movement of the pupil and then outputting horizontal and vertical movement detection signals of the pupil, and
      an eye movement tracking controller for outputting the horizontal deflection signal and vertical deflection signal to the retina projection means in response to the horizontal synchronous signal and vertical synchronous signal which is extracted by the synchronous circuit and the movement detection signals output from the picture processing device and permitting the direction of the beam emitted from the retina projection means to track the movement of the pupil; and
   said visible light conversion means, retina projection means and eye movement tracking means being disposed at a position remote from the viewer at a given interval.

2. A retina direct display device comprising:
   a visible light conversion means for a right eye for converting a video signal for the right eye including a horizontal synchronous signal and a vertical synchronous signal into a beam of visible light for the right eye;
   a visible light conversion means for a left eye for converting a video signal for the left eye including a horizontal synchronous signal and a vertical synchronous signal into a beam of visible light for the left eye;
   said video signals for the right and the left eyes being produced by photographing in different angles;
   a retina projection means for the right eye having:

a two-dimensional scanning means for the right eye for deflecting the beam for the right eye which is converted by the visible light conversion means for the right eye in horizontal and vertical directions in response to a horizontal deflection signal and a vertical deflection signal, and an optical system for the right eye for projecting a beam of visible light which is deflected by the two-dimensional scanning means for the right eye on the right eye so that a right retina is raster scanned through a pupil of the right eye by the projected beam for the right eye of a viewer;

a retina projection means for the left eye having:
a two-dimensional scanning means for the left eye for deflecting the beam for the left eye which is converted by the visible light conversion means for the left eye in synchronization with the deflection of beam by the two-dimensional scanning means for the right eye in response to the horizontal deflection signal and the vertical deflection signal, and an optical system for the left eye for projecting a beam of visible light which is deflected by the two-dimensional scanning means for the left eye on the left eye so that a left retina is raster scanned through a pupil of the left eye by the projected beam for the left eye;

an eye movement tracking means having:
a synchronous circuit for extracting the horizontal synchronous signal and the vertical synchronous signal included in the video signal, a photoelectric conversion device for converting a reflection light beam or an irradiation light beam which is sent from the eye side of one of or both of the right and the left eye into an electric signal, a picture processing device for comparing an image data of one of or both of the right and the left pupils of the present frame and an image data of one of or both of the right and the left pupils of one previous frame in response to the electric signal which is converted by the photoelectric conversion device and detecting the direction and quantity of the movement of one of or both of the right and the left pupils and then outputting horizontal and vertical movement detection signals of one of or both of the right and the left pupils, and an eye movement tracking controller for outputting the horizontal deflection signal and vertical deflection signal to the retina projection means for the right and the left eyes in response to the horizontal synchronous signal and vertical synchronous signal which is extracted by the synchronous circuit and the movement detection signals output from the picture processing device and permitting the directions of beams emitted from the retina projection means for the right and the left eyes to track the movement of the pupil; and said visible light conversion means for the right and the left eyes, retina projection means for the right and the left eyes and eye movement tracking means being disposed at a position remote from the viewer at a given interval.

3. A retina direct display device according to claim 1 or 2, wherein said optical system permits the diameter of the beam emitted from the retina projection means to be equal or larger than the diameter of the pupil and to be smaller than the diameter of a crystalline lens of the viewer's eyeball.

4. A retina direct display device according to claim 1 or 2, wherein said beam comprises a coherent laser beam or an incoherent optical beam.

5. A television receiver provided with said retina direct display device according to claim 1 or 2, wherein said retina direct display device includes an acoustic device for converting a sound signal to a sound.

6. A retina direct display device according to claim 3, wherein said beam comprises a coherent laser beam or an incoherent optical beam.

7. A television receiver provided with said retina direct display device according to claim 3, wherein said retina direct display device includes an acoustic device for converting a sound signal to a sound.

8. A television receiver provided with said retina direct display device according to claim 4, wherein said retina direct display device includes an acoustic device for converting a sound signal to a sound.

9. A retina direct display device comprising:
a visible light conversion means for converting a video signal into a beam of visible light;
a retina projection means having:
scanning means for deflecting the beam of visible light and
an optical system for projecting the deflected beam of visible light on both eyes of a viewer so that retinas are raster scanned through pupils of both eyes by the projected beam; and an eye movement tracking means for detecting movement of one of or both of the pupils and permitting the direction of the beam emitted from the retina projection means to track the movement of the pupils based on the result of the detection, said eye movement tracking means having a picture processing device for comparing an image data of one of or both of the right and left pupil of the present frame and an image data of the pupil of a previous frame to detect a direction and quantity of movement of the pupil.

10. A retina direct display device comprising:
a visible light conversion means for a right eye for converting a video signal for the right eye into a beam of visible light for the right eye;
a visible light conversion means for a left eye for converting a video signal for the left eye into a beam of visible light for the left eye;
said video signals for the right and the left eyes being produced by photographing in different angles;
a retina projection means for the right eye having:
scanning means for the right eye for deflecting the beam of visible light for the right eye and
an optical system for the right eye for projecting the deflected beam of visible light for the right eye on the right eye of a viewer so that the right retina is raster scanned through the pupils of the right eye by the projected beam;
a retina projection means for the left eye having:
scanning means for the left eye for deflecting the beam of visible light for the left eye and
an optical system for the left eye for projecting the deflected beam of visible light for the left eye on the left eye of a viewer so that the left retina is raster scanned through the pupils of the left eye by the projected beam; and
an eye movement tracking means for detecting movement of one of or both of the pupils and permitting the direction of the beam emitted from the retina projection means for the right and left eye to track the movement of the pupils based on the result of the detection, said eye movement tracking means having a picture processing device for comparing an image data of one of or both of the right and left pupil of the present frame and an image data of the pupil of a previous frame to detect a direction and quantity of movement of the pupil.

11. A retina direct display device according to claim 9 or wherein said optical system permits the diameter of the beam projected from the retina projection means to be equal or larger than the diameter of the pupil and to be smaller than the diameter of a crystalline lens of the viewer's eyeball.

12. A retina direct display device according to claim 9 or 10, wherein said beam of visible light comprises a coherent laser beam or an incoherent optical beam.

13. A television receiver provided with said retina direct display device according to claim 9 or 10, wherein said retina direct display device further comprises an acoustic device for converting a sound signal to a sound.

14. A retina direct display device according to claim 11, wherein said beam of visible light comprises a coherent laser beam or an incoherent optical beam.

15. A television receiver provided with said retina direct display device according to claim 11, wherein said retina direct display device further comprises an acoustic device for converting a sound signal to a sound.

16. A television receiver provided with said retina direct display device according to claim 12, wherein said retina direct display device further comprises an acoustic device for converting a sound signal to a sound.

* * * * *

UNITED STATES PATENT AND TRADEMARK OFFICE
CERTIFICATE OF CORRECTION

PATENT NO. : 5,703,637
DATED : December 30, 1997
INVENTOR(S) : Miyazaki Shigeyuki et al.

It is certified that error appears in the above-indentified patent and that said Letters Patent is hereby corrected as shown below:

In Claim 11, line 1, after "9 or" insert --10,--.

Signed and Sealed this

Fourteenth Day of July, 1998

Attest:

BRUCE LEHMAN

Attesting Officer

Commissioner of Patents and Trademarks